United States Patent [19]
Carnmalm et al.

[11] 3,904,691
[45] Sept. 9, 1975

[54] COMPOUNDS OF SPIRO-AMINE TYPE

[75] Inventors: Bernt Sigfrid Emanuel Carnmalm, Sodertalje; Tomas de Paulis, Gnesta; Svante Bertil Ross, Sodertalje; Sten Ingvar Rämsby, Sodertalje; Nils-Erik Stjernström, Sodertalje; Sven-Ove Ögren, Sodertalje, all of Sweden

[73] Assignee: Astra Lakemedel Aktiebolag, Sodertalje, Sweden

[22] Filed: May 25, 1972

[21] Appl. No.: 256,945

[30] Foreign Application Priority Data
June 11, 1971 Sweden................................ 7630/71

[52] U.S. Cl............ 260/576; 260/471 C; 260/501.1; 260/501.12; 260/515 R; 260/515 A; 260/544 M; 260/558 R; 260/562 P; 260/566 A; 260/566 B; 260/590; 260/611 F; 260/578; 424/330
[51] Int. Cl............................................. C07c 87/64
[58] Field of Search................... 260/576, 566, 578; 424/330

[56] References Cited
UNITED STATES PATENTS

| | | | |
|---|---|---|---|
| 2,520,516 | 8/1950 | Zoeren................................ | 260/329 |
| 3,419,604 | 12/1968 | Kaiser et al..................... | 260/576 X |
| 3,423,461 | 1/1969 | Kaiser et al..................... | 260/576 X |
| 3,576,853 | 4/1971 | Kaiser et al................. | 260/570.5 X |

OTHER PUBLICATIONS
Stauffer et al., "Journal Organic Chemistry," Vol. 25, pp. 935–938, (1960).

*Primary Examiner*—R. V. Hines
*Attorney, Agent, or Firm*—Brumbaugh, Graves, Donohue & Raymond

[57] ABSTRACT
Compounds of the formula

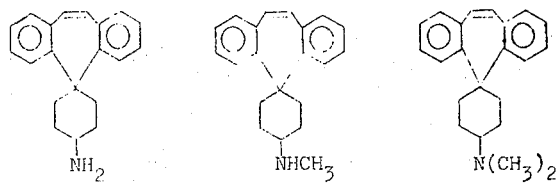
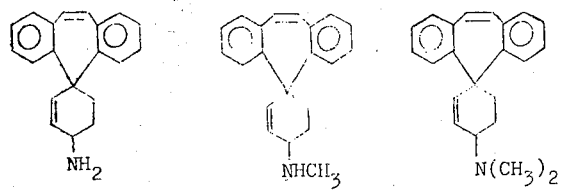
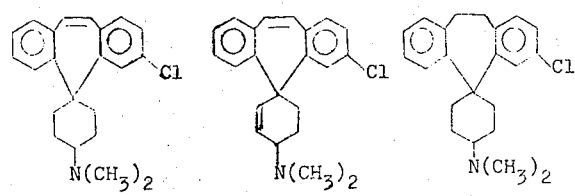
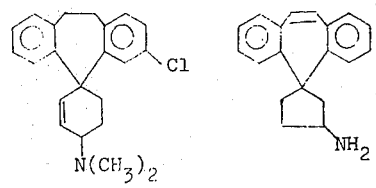

and pharmaceutically acceptable salts thereof; processes for their preparation; intermediates useful for their preparation; pharmaceutical preparations containing at least one of these compounds; and the use thereof in the treatment of depressive states.

8 Claims, No Drawings

COMPOUNDS OF SPIRO-AMINE TYPE

This invention relates to new compounds of the spiro-amine type and methods for their preparation. The invention also relates to the preparation of pharmaceutical preparations containing such compounds and to methods for the pharmacological use of the compounds. Further this invention relates to certain intermediates necessary for the preparation of the end products.

The main object of the invention is to provide compounds having anti-depressive and tranquilizing properties.

Depressions are considered to depend on changes in the biochemical processes of the brain which control the mood. The nature of this biochemical deficiency is largely unknown but in depressive states there is evidence for a decreased activity of monoaminergic brain neurons. The monoamines, noradrenaline (NA), dopamine (DA) and 5-hydroxytryptamine (5-HT), are of great interest in this respect.

It has been demonstrated that NA, DA and 5-HT is localised in three different types of neurones and may function as transmittors in the central nervous system. The monoamines are stored in special structures, granules, situated in enlargements of the nerve endings, varicosities. The varicosity is separated from the effector neuron by a space, the synaptic cleft or spatium. As a result of a nerve stimulation the transmittor is released from the granule into the synaptic cleft and reaches the receptor of the effector neuron and generates a nerve impulse. After impulse generation the amines are inactivated by mainly two mechanisms: a re-uptake mechanism at the cell membrane and enzymatic conversion by catechol-O-methyltransferase to form methylated metabolites. There is also an inactivating enzyme within the varicosities, monoamine oxidase (MAO), that is stored in the mitochondria and inactivates the amines intracellularly.

When MAO-inhibitors are administered, an increased amount of transmittor substance becomes available for release at the nerve ending.

Another way of increasing the amine levels at the receptor is exerted by the tricyclic antidepressants. It has been shown that this type of compounds inhibits the re-uptake mechanism of NA and 5-HT, and the antidepressive action is assumed to be related to the uptake inhibition of NA and 5-HT.

The over all clinical effect of the tricyclic antidepressants consists according to Kielholz (Deutsch Med.Wschr. 93, 1968) of three main components in various proportions:

b 1. Psychomotor activating or increase in drive
2. Elevation of mood
3. Relief of anxiety It has been proposed that the correlation between the clinical effects and the biochemical changes in the adrenergic neurones might be that the NA neurones are involved in psychomotor activity and the 5-HT-neurones are involved in the elevation of mood. The third component, relief of anxiety, may be caused by blockade of the NA and DA receptors, but probably not the 5-HT receptors. However, it should be pointed out that these theories are much simplified.

A compound frequently used for controlling depressions is imipramine (Tofranil)

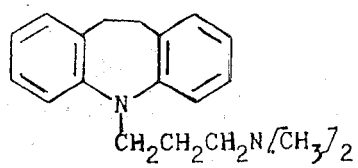

This compound is both mood elevating and psychomotor activating, but it possesses several disadvantages. It is anticholinergic and causes anticholinergic symptoms such as dryness of the mouth, tremor, tachycardia and sweating. In higher doses it can provoke serious heart arrhythmias and in normal doses it can cause toxic interactions in persons with heart failures. Further more, another drawback with treatment with imipramine is the late onset of the antidepressive effect which effect is observable first after 3 weeks of treatment.

According to the present invention it has now been found that these disadvantages can be overcome by using compounds selected from the group consisting of

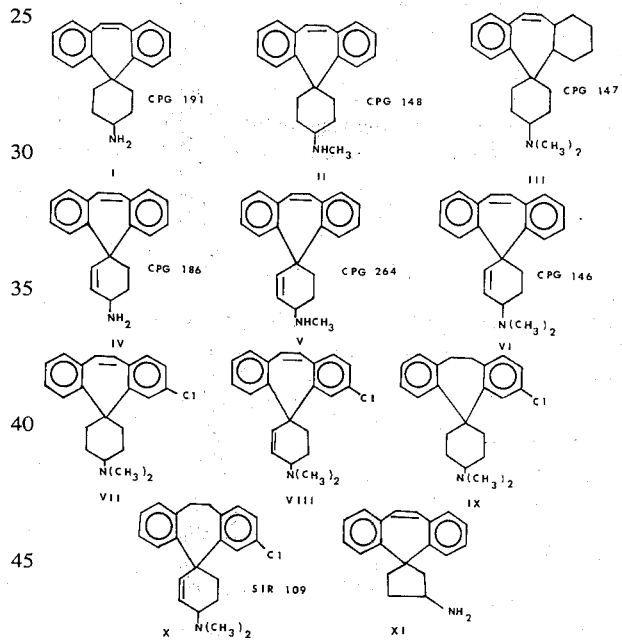

and pharmaceutically acceptable salts thereof.

Compounds described above which contain an asymmetric carbon atom exist in the form of optically active forms, and can be resolved into their optical antipodes by well known methods such as by using optically active acids such as tartaric acid, camphor-10-sulphonic acid, dibenzoyl tartaric acid and the like.

Some of the compounds described above can exist as stereo isomers, which forms constitute a further aspect of this invention. Mixtures of such isomers can be separated by methods known to the state of the art.

The compounds described above can be used as mixtures of the above mentioned isomeric forms or in the form of pure isomers.

The compounds of the formulas I–XI above can be prepared by reactions known per se from intermediates of the formulas

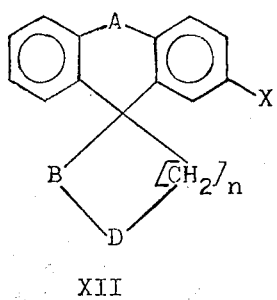 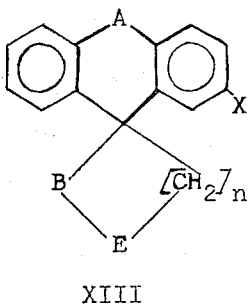

XII             XIII

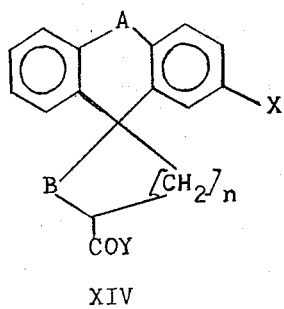

XIV wherein A and B are the same or different and each representing —CH$_2$CH$_2$— or —CH=CH—, n is an integer 1, 2 or 3, X is a hydrogen atom or Cl and >D is selected from the group consisting of the radicals >C=O,

wherein M is Cl, Br, I or OSO$_2$R'' and wherein R'' is a hydrogen atoms, an alkyl group with 1 to 5 carbon atoms such as methyl or an aryl group, such as phenyl or tolyl, >E is selected from the group consisting of the radicals >C=NOR'', >C=NOCOR'', >C=NO-SO$_2$R'', >C=NR,

and >C=N—NH—R'' in which radicals R'' has the meaning given above and R is a hydrogen atom or a methyl group, and Y is selected from the group consisting of the radicals —OH, —NH$_2$, —Cl, —Br, —I, —OCH$_3$ and —OC$_2$H$_5$.

The intermediates described above fall within the embodiment of this invention.

The intermediates of the formulas XII, XIII and XIV which are specially preferred have the formula

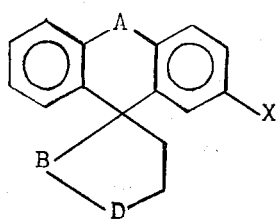

wherein A, B and X have the meaning defined above and >D is >C=O,

wherein M is Cl, Br, I or OSO$_2$CH$_3$, >C=NOH and

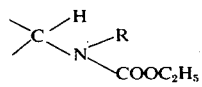

wherein R is a hydrogen atom or a methyl group.

The compounds of this invention with the formulas I–XI may be prepared according to several different methods.

A. Reaction of a compound of the formula

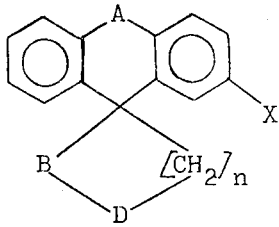

XII wherein A, B, X, n and D have the meaning defined above, with a compound of the formula

R'''NRR'   XV wherein R and R' are the same or different and each representing a hydrogen atom or a methyl group and R''' is a hydrogen atom, an acylic group or a sulphonylic group, gives a compound of the formulas I–XI.

This reaction may be carried out in the presence of a reducing agent. In the cases where an intermediate acylic derivative or the like is obtained, hydrolysis is necessary to obtain the compounds of the formulas I–XI.

An example of this type of reaction is the process wherein a compound of the formula

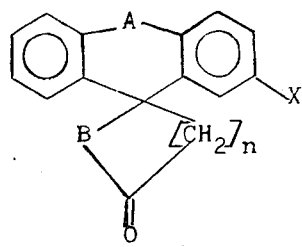

wherein A, B, X and n have the meaning given above, is reacted with a compound of the formula

R'''NRR' wherein R and R' have the meaning given above and R''' is a formyl group or a hydrogen atom, in formic acid as reducing agent (Leuckart - Wallach reaction), to give compounds of the formula I–XI. Other suitable reductive agents are for instance catalytically activated gaseous hydrogen or hydrides as NaBH$_3$CN.

B. Amines of the formulas I–XI may also be obtained by reducing a compound of the formula

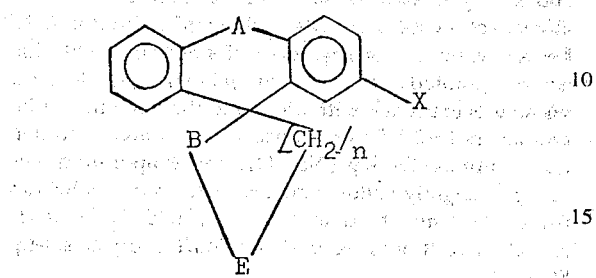

wherein A, B, E, $n$ and X have the meaning given above. Suitable reducing agents are hydrogen in status nascendi (sodium and some alcohol; zinc and acetic acid), catalytically activated hydrogen gas (Pt, Pd, Ni are appropriate catalysts) and hydrides.

C. The amines of the formula I–XI are obtained e.g. when compounds of the formula

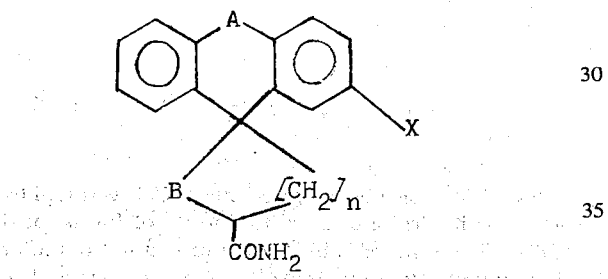

wherein A, B, X, and $n$ have the meaning defined above, are treated with hypobromite or hypochlorite according to the conditions of the Hofmann reaction, which gives a primary amine, and if the secondary or tertiary amine is desired converting the obtained primary amine in ways known per se to the corresponding secondary or tertiary amine.

D. The amines of the formula I–XI are obtained when compounds of the formula

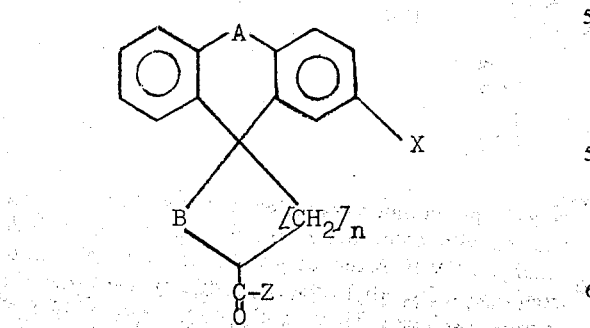

wherein A, B, X, and $n$ have the meaning given above, and Z is a hydroxy group, a halogen group, e.g. chlorine or another acid residue, e.g. an acid anhydride, are treated with hydrazoic acid (HN$_3$) or an inorganic salt thereof according to the conditions of the Schmidt reaction, which gives a primary amine, and if a secondary or tertiary amine is desired converting the obtained primary amine in ways known per se to the corresponding secondary or tertiary amine.

In the cases in the methods (A–D) where an intermediate acylic derivative or the like is obtained, hydrolysis is necessary to obtain the compounds of the formulas I–XI.

Both organic and inorganic acids can be employed to form non-toxic pharmaceutically acceptable acid addition salts of the compounds of this invention. Illustrative acids being sulfuric, nitric, phosphoric, hydrochloric, citric, acetic, lactic, tartaric, pamoic, ethanedisulfonic, sulfamic, succinic, cyclohexylsulfamic, fumaric, maleic and benzoic. These salts are readily prepared by methods known to the art.

In clinical practice the compounds of the present invention will normally be administered orally or by injection, in the form of pharmaceutical preparations comprising the active ingredient either as a free base or as a pharmaceutically acceptable non-toxic, acid addition salt, e.g. the hydrochloride, lactate, acetate, sulfamate, and the like, in association with a pharmaceutically acceptable carrier. Accordingly, terms relating to the novel compounds of this invention, whether generically or specifically, are intended to include both the free amine base and the acid addition salts of the free base, unless the context in which such terms are used, e.g. in the specific examples, would be inconsistent with the broad concept. The carrier may be a solid, semisolid or liquid diluent or capsule. These pharmaceutical preparations constitute a further aspect of this invention. Usually the active substance will constitute between 0.1 and 95% by weight of the preparation, more specifically between 0.5 and 20% by weight for preparation intended for injection and between 2 and 50% by weight for preparations suitable for oral administration.

To produce pharmaceutical preparations containing a compound of the invention in the form of dosage units for oral application, the selected compound may be mixed with a solid fine grain carrier, e.g., lactose, saccharose, sorbitol, mannitol, starches such as potato starch, corn starch or amylopectin, cellulose derivatives, or gelatin and a lubricant such as magnesium stearate, calcium stearate, polyethylene glycol waxes, and the like, and them compressed to form tablets. If coated tablets are required, the cores, prepared as described above, may be coated with a concentrated sugar solution which may contain, e.g., gum arabic, gelatin, talcum, titanium dioxide, and the like. Alternatively, the tablet can be coated with a lacquer dissolved in a readily volatile organic solvent or mixture of organic solvents. Dyestuffs may be added to these coatings in order to readily distinguish between tablets containing different active substances of different amounts of the active compound.

For the preparation of soft gelatin capsules (pearl-shaped closed capsules) consisting of gelatin and, for example, glycerol or similar closed capsules, the active substance may be admixed with a vegetable oil. Hard gelatin capsules may contain granulates of the active substance in combination with solid, fine grain carriers such as lactose, saccharose, sorbitol, mannitol, starches (e.g. potato starch, corn starch or amylopectin), cellulose derivatives or gelatin.

Liquid preparations for oral application may be in the form of syrups or suspensions, for example, solutions containing from about 0.2 to about 20% by weight of the active substance herein described, the balance being sugar and a mixture of ethanol, water, glycerol and propyleneglycol. Optionally such liquid preparations may contain colouring agents, flavouring agents, saccharine and carboxymethylcellulose as a thickening agent.

Solutions for parenteral applications by injection can be prepared in an aqueous solution of a water-soluble pharmaceutically acceptable salt of the active substance preferably in a concentration of from about 0.5 to about 10% by weight. These solutions may also contain stabilizing agents and/or buffering agents and may conveniently be provided in various dosage unit ampoules.

In therapeutical treatment the suitable diurnal doses of the compounds of the invention are 5–500 mg for oral application, preferentially 50–250 mg and 1–100 mg for parenteral application, preferentially 10–50 mg.

$-10°- -5°C$ and was completed in about 2 hours. After further stirring for 15 minutes a solution of 206 g of the ketone XVI (1.0 mole) (commercially available) in 1 l of tetrahydrofuran was slowly added at $-10°C$. The mixture turned first violet and then rather dark. It was allowed to reach room temperature slowly (1–2 hours) and finally heated at 50°C for 30 minutes. The now faintly yellow mixture was cooled and poured into 1.5 l of ice-water containing 200 g of ammonium chloride, an oil separated and was taken up in ether, the aqueous phase was extracted with ether and the combined ethereal layers (~2.5 l) were washed with water until neutral to litmus. Drying ($Na_2SO_4$) and evaporation gave 226 g of slightly yellow crystals. After recrystallization from ~800 ml of ethanol 203 g (yield 81%) of the enolether XVII was secured as colourless crystals. M.p. 86–87°C.

b)

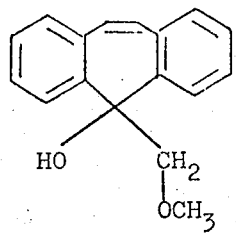  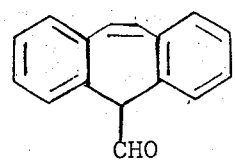 CPG 139

XVII          XVIII

The following examples will further illustrate the invention.

PREPARATION OF INTERMEDIATES

EXAMPLE 1.

Preparation of spiro[2-cyclohexene-1,5′(5′H)-dibenzo[a,d]cycloheptene]-4-one a)

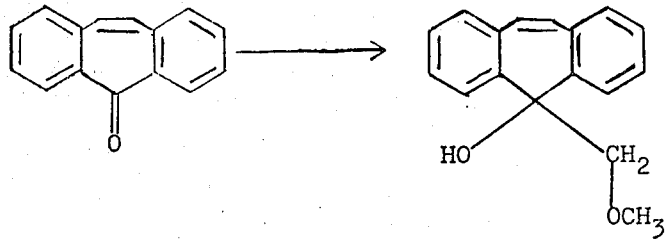 CPG 138

XVI          XVII 48.6 g of magnesium turnings (2.0 mole) covered with 100 ml of dry tetrahydrofuran were treated with 2.5 g of mercuric chloride. When the liquid showed a grey tint after about 5 minutes stirring there was started a dropwise addition of 150 ml of freshly distilled chlorodimethylether (2.0 mole) in 150 ml of tetrahydrofuran. When the temperature began to rise the mixture was quickly cooled to $-10°C$, the addition continued at 166 g (0.66 mole) of the glycolether XVII was rapidly added with stirring at 50°C to 350 ml of formic acid (98%). The solution immediately turned red but after three minutes the colour had disappeared again. The temperature was raised to 60°C in ten minutes, 10 ml of sulfuric acid (0.1 N) added and the mixture cooled to room temperature in an ice bath. Then it was slowly poured with stirring into 1.5 kg of ice water containing 200 ml of sulfuric acid (1 M). After two hours of stirring the precipitated colourless crystals were collected, washed with water and air dried giving 110 g of crude aldehyde XVIII. After recrystallization from 500 ml of a mixture of diethyl ether and diisopropyl ether the product weighed 71 g (yield 49%) and melted at 109.5°–110.5°.

33 g of the aldehyde XVIII and 13.2 ml of freshly distilled methyl vinyl ketone were dissolved in 250 ml of c)

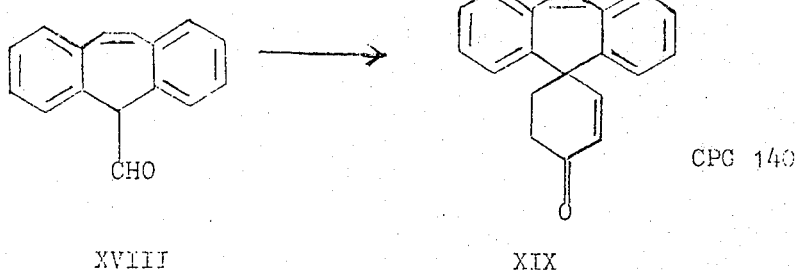

XVIII           XIX dry tetrahydrofuran and 10 ml of ethanolic potassium hydroxide (10% w/v) was added slowly during about 1 hour at 10°c under nitrogen. After stirring at ambient temperature for another 3 hours there was added 1 l of diethyl ether and 200 ml of water and the mixture was neutralised with dilute hydrochloric acid. Washing the etheral layer with water, drying ($Na_2SO_4$) and evaporation gave 40.8 g of a hard, semicrystalline, yellow gum. Some tests with TLC showed benzene to be a good developing solvent. All the yellow material was chromatographed on a column (1 kg of silicic acid, 0.2–0.5 mm) with benzene as eluant. Some of the starting material was recovered from the first fractions, then 26 g of the spiroketone XIX was obtained, the rest on the column was probably of polymeric nature. Crystallization from 500 ml of ethanol gave 18.6 g (yield 44%) of the ketone as colourless crystals, m.p. 138°–139°C.

EXAMPLE 2

Preparation of spiro[2-cyclohexene-1.5'(5'H)-dibenzo[a,d]cycloheptene]-4-one oxime

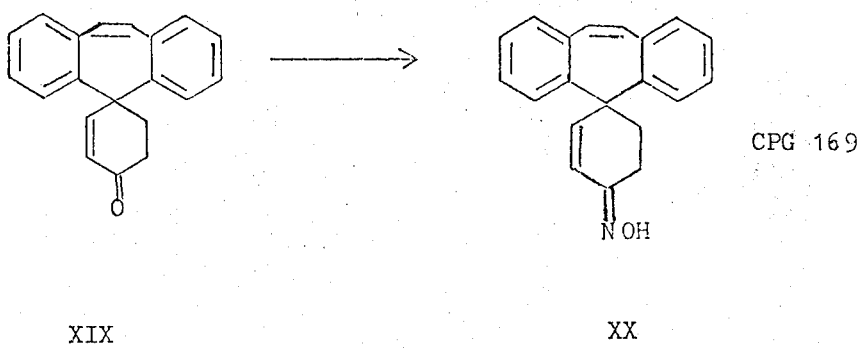

XIX           XX

A mixture of 10 g of XIX (37 mmole), 10 g of hydroxylamine hydrochloride (144 mmole), 100 ml of dry pyridine, and 100 ml of absolute ethanol was refluxed for 45 minutes. The clear solution was evaporated to dryness in vacuo and the residue crystallised from ethanol water (3+1) and then from absolute ethanol. The colourless crystals of compound XX with m.p. 85°–87° weighed 7.6 g, yield 65%.

EXAMPLE 3

Preparation of 4-(ethoxycarbonylamino)spiro[2-cyclohexene-1.5'(5'H)-dibenzo[a,d]cycloheptene]

XXI           XXII 2.2 g of ethyl chloroformate (20 mmole) was added dropwise for 10 min. with ice cooling and efficient stirring to a solution of 3.2 g of the amine XXI (12 mmole) in 20 ml of chloroform in the presence of 10 ml of sodium hydroxide solution (2M). After further 10 minutes stirring the chloroform phase was washed with water, dried ($Na_2SO_4$) and evaporated. The residue crystallized when triturated with isopropyl ether giving the urethane XXII as colourless crystals, 3.16 g (yield 78%) m.p. 153°–154°C from isopropyl ether.

EXAMPLE 4

Preparation of spiro[cyclohexane-1,5'(5'H)-dibenzo[a,d]cycloheptene]-4-one

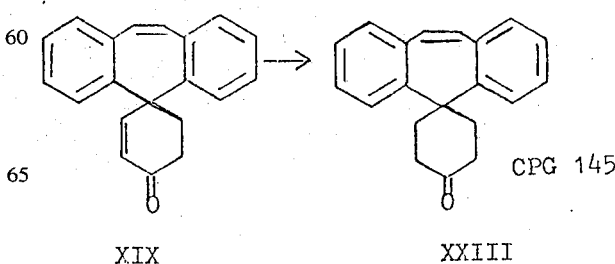

XIX           XXIII 17.0 g of the cyclohexenone XIX in 200 ml of glacial acetic acid was hydrogenated over 3.0 g of a palladium catalyst (5% on carbon) at ambient temperature and pressure. After about 1 hour the requisite amount of hydrogen (1.4 l) had been consumed and the uptake ceased. A precipitate had formed which was dissolved on warming. The catalyst was filtered off hot and the solution chilled to give crystals of the cyclohexanone XXIII. Recrystallization from 400 ml of ethanol gave 12.3 g (yield 72%) of the pure ketone m.p. 164°–165°C.

EXAMPLE 5

Preparation of 4-(formylmethylamino)spiro[cyclohexane-1,5'(5'H)-dibenzo[a,d]cycloheptene]

3.9 g of magnesium turnings and a few crystals of iodine were covered with 10 ml of dry formaldehyde dimethylacetal (methylal) under nitrogen and heated to reflux until the iodine colour had disappeared. After cooling to room temperature 2 mg of mercuric chloride was added and 15 minutes later a dropwise addition of 12 g of chloromethylether in 20 ml of methylal was started. The addition was done at ambient temperature until the reaction had started and then at about −10°C. It took in all about one hour and the mixture was then stirred for another hour at −5°−−10°C. 20 g of the chloroketone XXV [prepared according to Winthrop et al., J. Org. Chem., 27, 230 (1962)] dissolved in 45 ml of methylal was added dropwise, still with cooling. The mixture turned red and finally deep violet. During an additional hour of stirring it was allowed to reach room temperature. 20 ml of saturated solution of ammonium chloride was added and the pH adjusted to 1–2 with hydrochloric acid (2M) and the mixture extracted with ether (3 × 100 ml).

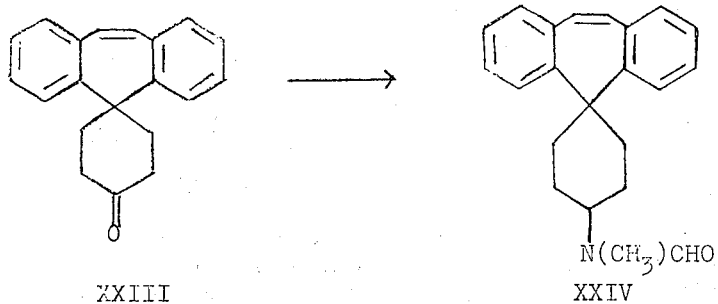

XXIII          XXIV

Methylammonium formate (from 4 ml of methylamine and 0.8 ml of formic acid) together with a suspension of 2 g of the spiroketone XXIII in 5 ml of N-methylformamide was heated under reflux for 5 hours, bath temperature 150°C. The reaction mixture was dissolved in benzene and washed with dilute hydrochloric acid and water. After drying (Na₂SO₄) the benzene was evaporated giving a product XXIV (1.86 g) which was recrystallized from 15 ml of methanol yielding 1.2 g (52%) of colourless crystals melting at 188°–190°C.

The combined extracts were washed with saturated sodium carbonate solution, dried (Na₂SO₄) and evaporated in vacuo. The oily residue was distilled under nitrogen at reduced pressure, yielding 21.3 g of the glycol ether XXVI (89%) as a slightly yellow highly viscous oil, b.p. 186°–187°/0.05.

b)

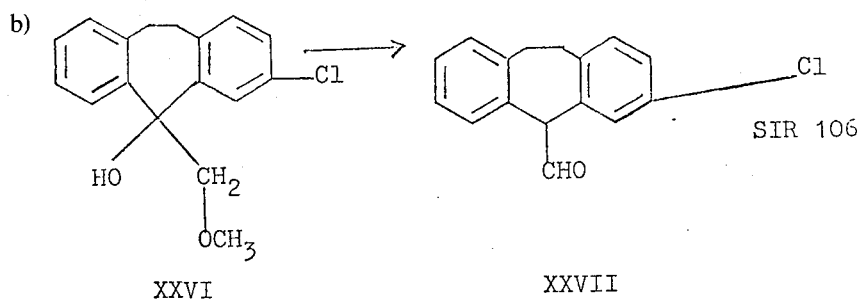

XXVI          XXVII

EXAMPLE 6

Preparation of 3-chloro-10,11-dihydrospiro[5H-dibenzo[a,d]cycloheptane-5,1'-cyclohexane-4'-one(22)]

a)

78 g of the glycol ether XXVI was rapidly added with stirring to 600 ml of boiling, formic acid (98%). After 5 minutes sulfuric acid (1M) was added dropwise to the green solution until a small amount of oil separates (∼100 ml), and the boiling was continued for further

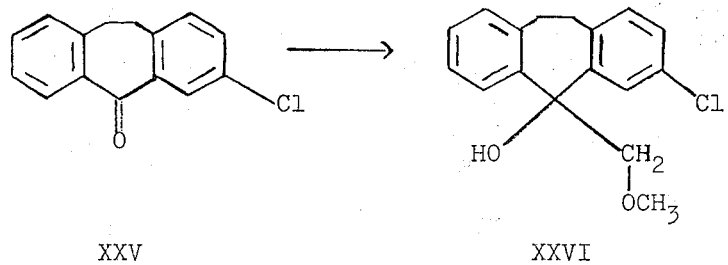

XXV          XXVI 15 minutes. On cooling an oil separated which crystallizes on cooling. The greenich solid material was collected (57 g) and crystallized from benzene- petroleum-ether giving the aldehyde XXVII as colourless crystals (52 g; 74%) m.p. 147°–148°C.

c)

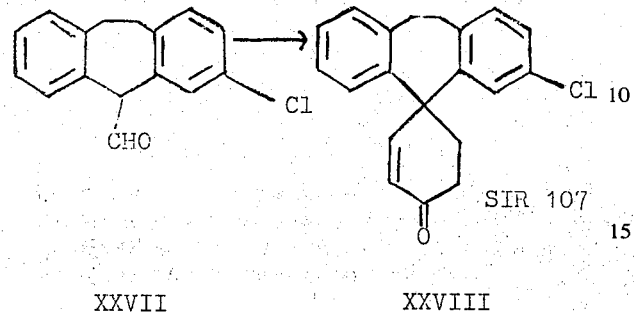

XXVII    XXVIII

To a solution of 5.15 g of the aldehyde XXVII and 1.68 g of methyl vinyl ketone in a mixture of 45 ml of dry tetrahydrofuran and 5 ml of hexamethylphosphorictriamide was added dropwise under nitrogen 2.1 ml of ethanolic potassium hydroxide (3M) with stirring at room temperature. After completed addition the solution was held at room temperature for 2 hours and then at 40°C for 16 hours. The reaction mixture was neutralised with hydrochloric acid (2M), further diluted with water and extracted with benzene. Washing with saturated sodium carbonate solution, drying ($Na_2SO_4$) and evaporation in vacuo gave an oily residue which was shown by TLC (silica, benzene as eluant) to contain at least four components. Column chromatography on silica (1 kg) with benzene as eluant gave the spiroketone XXVIII as colourless crystals, 2 g (31%) m.p. 113°–114°C.

d)

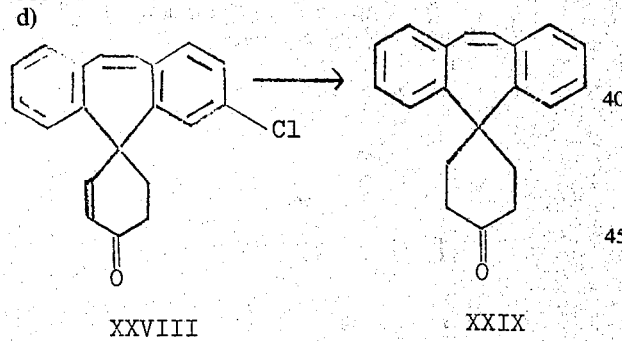

XXVIII    XXIX

The compound XXIX was prepared as described for compound XXIII. Yield 72%. m.p. 129°–131° from i-PrOH.

EXAMPLE 7

Preparation of spiro[cyclohexane-1,5′(5′H)-dibenzo[a,d]cycloheptene]-4-one oxime

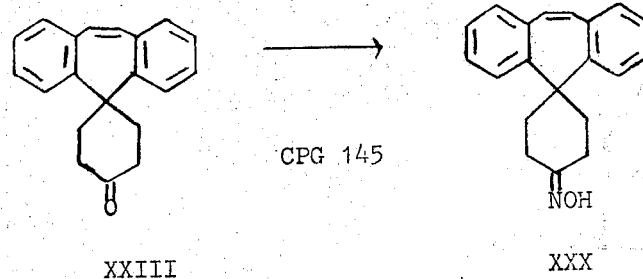

XXIII    XXX 4 g of the ketone XXIII and 4 g of hydroxylamine hydrochloride in 40 ml of pyridine was heated under reflux for 2 hours. The mixture was then poured into 400 ml of water, the formed crystalline precipitate collected and washed with water. Recrystallization from acetonitrile gave 3.1 g (yield 73%) m.p. 181°–183°C.

EXAMPLE 8

Preparation of 3-chlorospiro[5H-dibenzo[a,d]cycloheptene-5,1′-cyclohexane]-4′-one a)

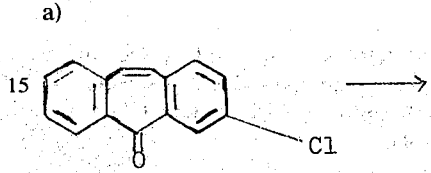

XXXI

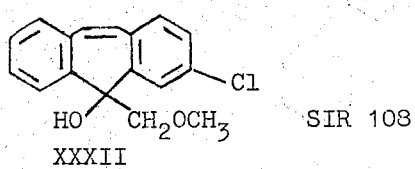

XXXII

The compound XXXII was prepared as described for compound XVII but with methylal instead of THF as solvent. The starting ketone XXXI had poor solubility in dry methylal. It was added portionwise during 1 h. The yield was 82%, m.p. 92°–93° from EtOH.

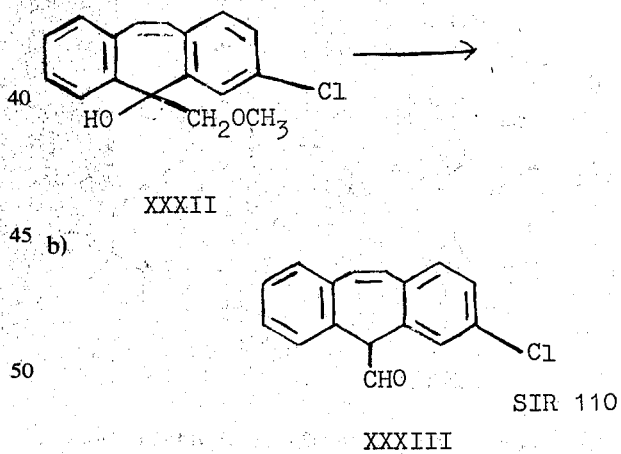

XXXII b)

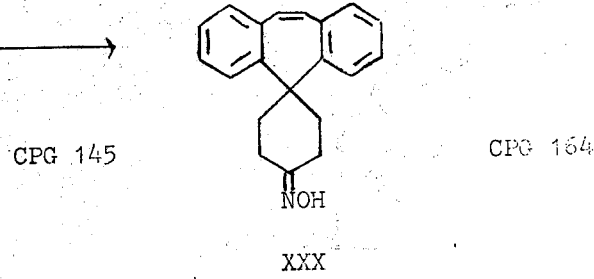

XXXIII

The compound XXXIII was prepared as described for compound XVIII from the glycol ether XXXII in 51% yield. M.p. 133°–134° from i-$Pr_2O$.

c)

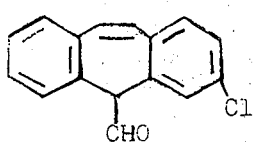

XXXIII

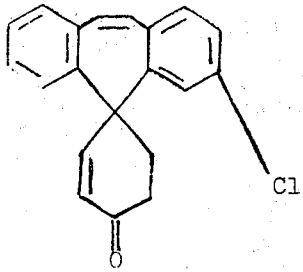

XXXIV

The compound XXXIV was prepared by the same procedure as described for compound XIX and isolated by column chromatography on Al$_2$O$_3$. Yield 41% m.p. 123°–125° from EtOH.

d)

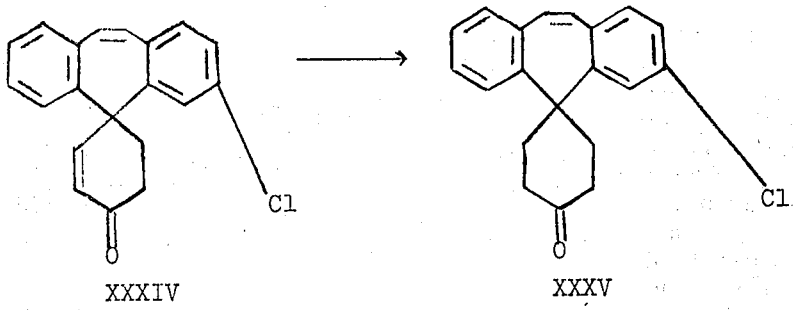

XXXIV     XXXV

The compound XXXV was prepared by the procedure described for compound XXIII. Yield 78% m.p. 132°–134° from i-PrOH.

EXAMPLE 9

Preparation of methyl spiro5H-dibenzo[a,d]cycloheptene-5,1′-cyclopentane]-3′-carbamate a)

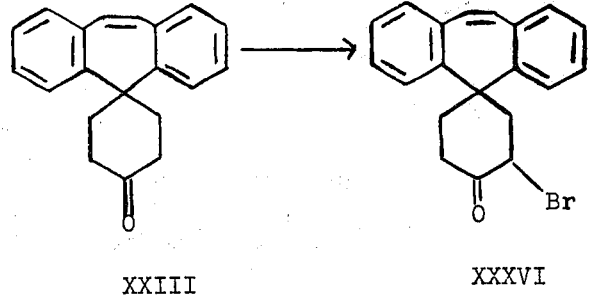

XXIII     XXXVI

To a solution of 10.0 g (0,036 mole) of the cyclohexanone XXIII in 100 ml of CHCl$_3$ at 0°, was added dropwise 5.8 g (0.036 mole) of Br$_2$ (0.5 h). Then 100 ml of water was added, the organic phase separated, dried (Na$_2$SO$_4$) and evaporated. Trituration with 200 ml of Et$_2$O gave 7.7 g (60% m.p. 140°–142°.

b)

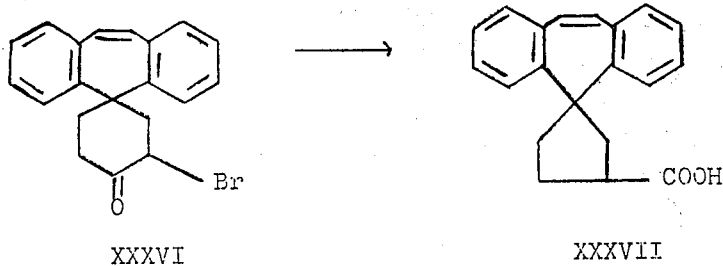

XXXVI     XXXVII

Portionwise addition of 4.6 g (0.013 mole) of the bromo ketone XXXVI to a stirred solution of NaOMe (made from 0.7 g (0.03 mole) in 50 ml of MeOH) at 0°, then at 20° for 5 hours and evaporation gave equivalent yield of methyl spiro-[5H-dibenzo[a,d]cycloheptene-5,1′-cyclopentane]-3′-carboxylate. This ester was treated with water (80 ml) and 10 N NaOH (2 ml) at 60° for 2 hours. Et$_2$O was added, the aqueous phase washed with Et$_2$O and made acidic with diluted H$_2$SO$_4$. Extraction with 3 × 100 ml of Et$_2$O, drying (Na$_2$SO$_4$) and evaporation gave 3.7 g (97%), m.p. 110°–111° from n-hexane.

c)

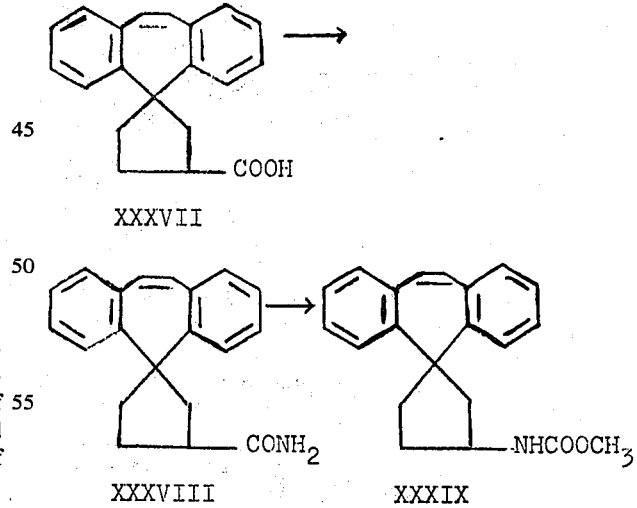

XXXVIII     XXXIX

Treatment of 11.3 g (0.039 mole) of the acid XXXVII with 60 ml of SOCl₂ for 2 hours at reflux and evaporation gave a crude material of spiro[5H-dibenzo[a,d]cycloheptene-5,1'-cyclopentane]-3'-carboxylic acid chloride. To this was added 200 ml of Et₂O and the solution transferred to a dropping funnel. Gaseous NH₃ was bubbling through 150 ml of a mixture of Et₂O—C₆H₆ (1:1) with simultaneous adding of the acid chloride. The NH₃ inlet was continued for another 2 hours. Then water was added and the organic layer washed 3 times (H₂O). Drying (Na₂SO₄) and evaporation gave crystals upon trituration with boiling toluene. Total 7.4 g (65%) of spiro[5H-dibenzo-[a,d]cycloheptene-5,1'-cyclopentane]-3'-carboxylamide XXXVII were collected. M.p. 181°–183°, NMR (CDCl₃)δ5.9(b 2, CONH₂).

Then was added portionwise 6.5 g (0.023 mole) to 38 to NaOMe (made from 1.05 g (0.095 mole) of Na) in 150 ml of MeOH followed by 3.6 g (0.023 mole) of Br₂ at 0°. The solution was slowly heated to 50°. The excess MeOH was disposed of by evaporation and water was added. Extraction with CHCl₃ afforded crystals from Et₂O. Recrystallisation from Et₂O gave 5.8 g (81%) of XXXIX m.p. 65°–67°.

PREPARATION OF END COMPOUNDS

EXAMPLE 10

Preparation of
4-(dimethylamino)spiro[2-cyclohexene-1,5'(5'H)dibenzo[a,d]cycloheptene]

To 10 ml of liquid dimethylamine was added with care 2.0 g of formic acid (98%) at −15°C, and then a solution of 5.0 g of the spiroketone XIX (16.7 mmole) prepared according to example 1 in 12.5 ml of DMF. The mixture was heated under reflux for 5 hours, bath temperature 150°C. After dilution with ether the product was extracted with hydrochloric acid (2M). Alkalisation, extraction with ether, drying (Na₂SO₄), and evaporation gave 5 g of a colourless oil.

The picrate was prepared by mixing ether solutions of this oil and of picric acid giving 8 g of yellow crystals. Recrystallization from ethanol-acetone (25 ml + 50 ml) gave 5.7 g melting at 196°–203°C. The free amine XXXIX was secured by treating the picrate with sodium hydroxide solution (2M) and ether, drying and evaporation yielded 3.4 g of an oil (62%).

EXAMPLE 11

Preparation of 4-aminospiro[2-cyclohexene-1,5'(5'H)dibenzo[a,d]cycloheptene]

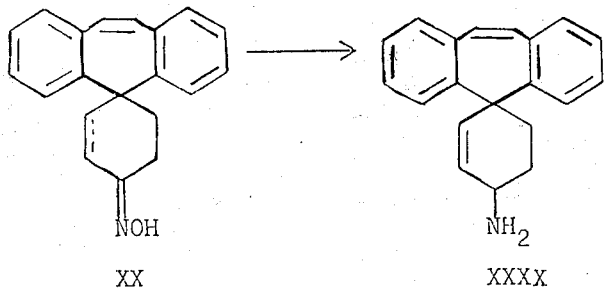

CPG 186

6.5 g of the oxime (18 mmole) prepared according to example 2 dissolved in 250 ml of dry benzene was added with stirring at ambient temperature to 40 g of a benzene solution (70%) of sodium dihydro bis- (2 methoxy-ethoxy) aluminate. After refluxing the clear solution for 4 hours saturated aqueous sodium sulphate was added with cooling and the precipitated alumina filtered off. To the filtrate was added hydrogen chloride in diethyl ether (~4 M) until the amine hydrochloride was completely precipitated. Stirring this hydrochloride was aqueous sodium hydroxide (2 M) and ether, drying the ether phase and evaporating gave the amine XXXX as an oil, 4.6 g, yield 88%.

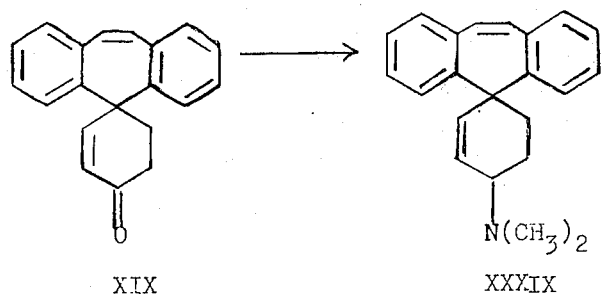

CPG 146

EXAMPLE 12

Preparation of
4-(methylamino)spiro[2-cyclohexene-1,5'(5'H)dibenzo[a,d]cycloheptene]

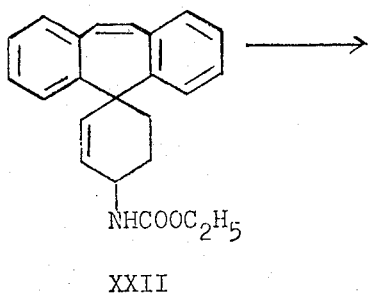

XXII

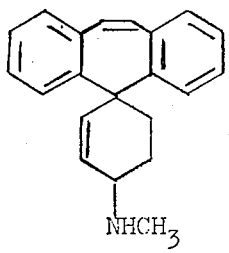

XXXXI   CPG 264

0.75 g of the urethane XXII (2.2 mmole) prepared according to example 3 dissolved in 50 ml of ether was added to a slurry of 0.25 g of lithium aluminium hydride (5.2 mmole) and the mixture heated under reflux for 5 hours. The hydride complex was destroyed by adding 5 ml of a saturated solution of sodium sulphate. To the filtered and dried solution was added hydrogen chloride in ether and the precipitated hydrochloride of the amine XXXXI was collected. Recrystallization from ethanol-water gave 0.5 g (71.5 %) of colourless material m.p. 260°d. The hydrochloride is only sparingly soluble in water (~1%).

EXAMPLE 13

Preparation of
4-dimethylaminospiro[cyclohexane1,5'(5'H)-dibenzo[a,d]cycloheptene]

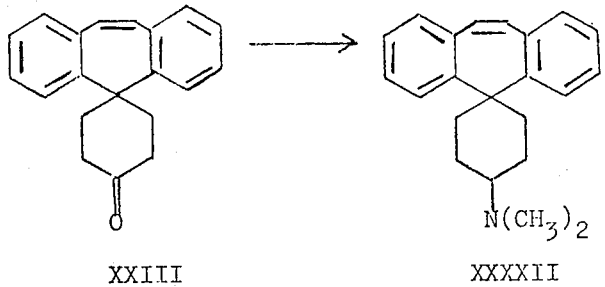

XXIII                                              XXXXII

Using 3.4 g of the spiroketone prepared according to example 4, 4.2 g of dimethylamine and 1.2 g of formic acid in 7.7 g of DMF the reaction was performed as for compound XXX but with 4 hours heating and bath temperature 195°C. The extraction procedure gave 3.2 g of white colourless crystals of XXXXII melting about 90°C. Recrystallization from petroleum ether gave 1.9 g (68%) m.p. 101°–103°, further crystallization from ether gave an analytical sample m.p. 104°–105°. The hydrochloride, prepared from ethereal hydrogen chloride, melted at 180°–185°C.

EXAMPLE 14

Preparation of
4-(methylamino)spiro[cyclohexane-1,5'(5'H)-dibenzo[a,d]cycloheptene]

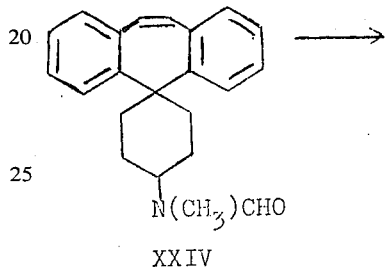

XXIV

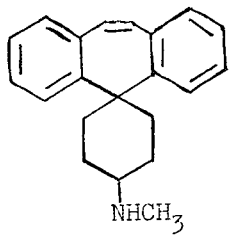

XXXXIII   CPG 148

1.5 g of the formyl compound XXIV prepared according to example 5 was dissolved in a mixture of 25 ml of dimethylsulfoxide and 5 ml of concentrated hydrochloric acid and heated at 100°C for 3 hours. Evaporation at reduced pressure gave a residue which was dissolved in 25 ml of water and washed with benzene. The solution was then made alkaline and extracted with benzene, which gave 1.2 g of an oil after drying and evaporation. 0.8 g of this oil in dry ether was mixed with an ether solution of malic acid to give a precipitate which was recrystallized from ethanol. 0.56 g of malate m.p. 194°–196° was obtained, and from the salt the amine XXXXIII was set free as an oil crystallizing on cooling and scraping. White crystals m.p. 86.5°–88°, yield 0.3 g, 33 %.

CPG 147

EXAMPLE 15

Preparation of 3'-chloro-10',
11'-dihydro-4-(dimethylamino)spiro[2-cyclohexene-1,5'(5'H)-dibenzo[a,d]cycloheptene]

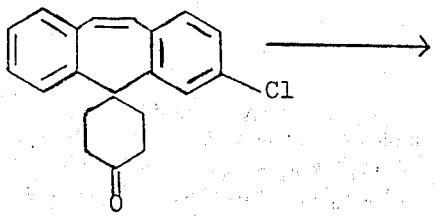

XXVIII

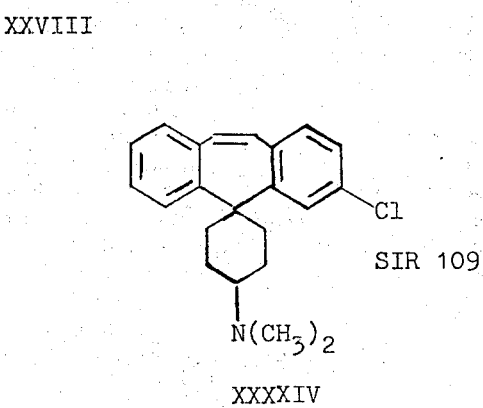

XXXXIV

A solution of 1 g of the ketone XXVIII prepared according to example 6 in 2 ml of DMF was added to dimethylammonium formate prepared from 0.25 ml of formic acid and 1.0 g of dimethylamin (confer prep. of compound XXX). The mixture was refluxed for 5 hours cooled, diluted with diethyl ether and extracted with hydrochloric acid (10%). The acid layer was alkalized and extracted with diethyl ether. Drying (Na₂SO₄) and evaporation gave a colourless oil which was again dissolved in dry diethyl ether and treated with hydrogen chloride (4-m in ether) to precipitate the hydrochloride of the amine XXXXIV (965 mg). Recrystallization from ethanol-ether gave 820 mg of crystals m.p. 241°–242°C.

EXAMPLE 16

Preparation of
4-aminospiro[cyclohexane-1,5'(5'H)-dibenzo[a,d]cycloheptene]

3 g of the oxime XXIX prepared according to Example 7, and 1,5 g of lithium aluminium hydride was refluxed in 300 ml of diethyl ether for 4 hours and then stirred at ambient temperature over night. The reaction mixture was worked up as described for XXXI. The amin XXXXV was isolated as its salt with maleic acid which was recrystallized from water. Yield 2 g (47%) melting at 199°–200°.

EXAMPLE 17

Preparation of
3-chloro-10,11-dihydro-N,N-dimethylspiro[5H-dibenzo[a,d]cycloheptene-5,1'-cyclohexane]-4'-amine

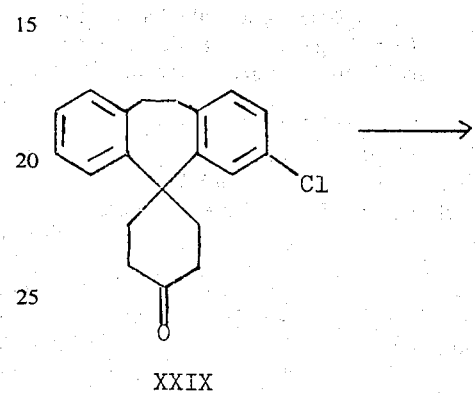

XXIX

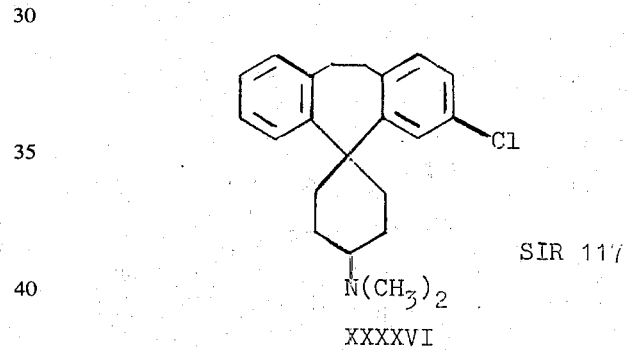

XXXXVI

Treatment of XXIX (2.0 g, 6.5 mmole) with dimethylammonium formate in DMF as described above for the preparation of XXXXII afforded 1.10 g (45%) of the hydrochloride from i-PrOH. M.p. 270°–273°.

EXAMPLE 18

Preparation of
3-chloro-N,N-dimethylspiro[5H-dibenzo[a,d]cycloheptene-5,1'-cyclohexane]-4'-amine

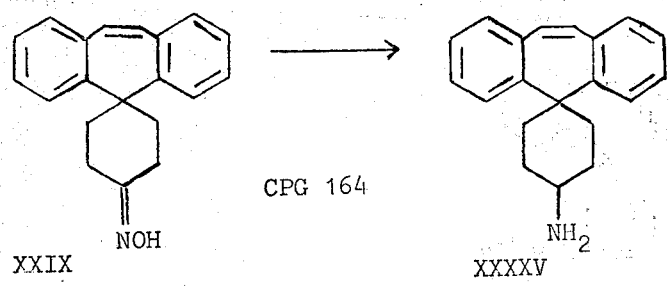

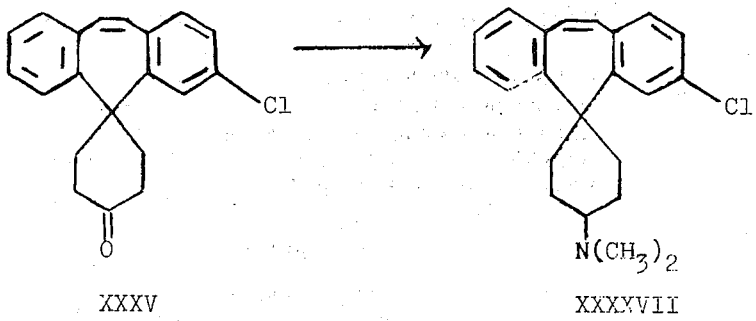

XXXV → XXXVII SIR 113

Treatment of XXXV (1.75 g, 5.7 mmole) with dimethylammonium formate in DMF as described above for the preparation of XXXXII gave 1.70 g (80%) of hydrochloride hydrochloide from EtOH—Et$_2$O m.p.

EXAMPLE 19

Preparation of 3-chloro-N,N-dimethylspiro[5H-dibenzo[a,d]cycloheptene-5,1′-cyclohex-2′-ene]-4′-amine

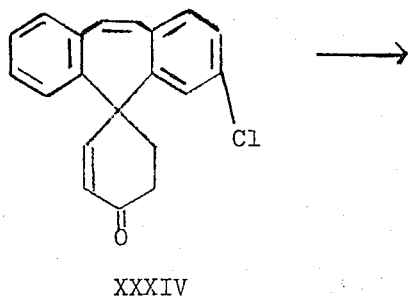

XXXIV → XXXXVIII SIR 114

Treatment of XXXIV (1.40 g, 4.6 mmole) with dimethylammonium formate in DMF as described above for the preparation of XXXXII gave 1.50 g crude product. The amine XXXXVIII was isolated by chromatography on basic alumina Woelm (160 g, activity and gradienteluted with C$_6$H$_6$— i—Pr$_2$O to give 1.20 g (77%) of the desired amine. The hydrochloride from EtOH.

EXAMPLE 20

Preparation of spiro[5H-dibenzo[a,d]cycloheptene-5,1′-cyclopentane]-4′-amine

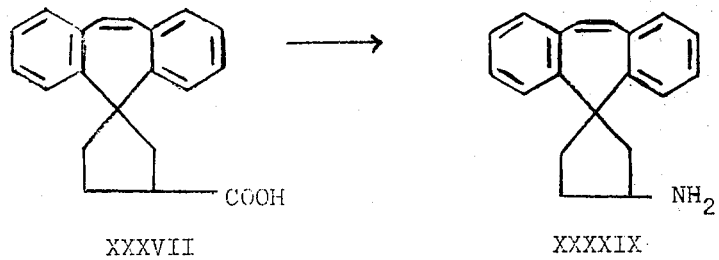

XXXVII → XXXXIX

To 11 g (0.038 mole) of acid XXXVII in H$_2$O (6 ml) and Me$_2$CO (50 ml) at 5° was added 4.6 g (0.045 mole) of triethylamine in Me$_2$CO (50 ml). Then 5.4 g (0.049 mole) of ethyl chloroformate in Me$_2$CO (20 ml) was slowly added and the mixture was stirred at 10° for 2 hours. Cooling to 0°, addition of 3.7 g (0.057 mole) of NaN$_3$ in H$_2$O (15 ml) and then stirring at 10°for another 2 hours, pouring the mixture into 500 ml of cold water, gave an oil which was taken up in Et$_2$O. The etheral phase was reduced to 50 ml and added to 100 ml of 70% AcOH (aq), and heated to 100° for 2 hours, addition of 100 ml of concentrated HCl and then standing at 100° over night gave 3.0 g (26%) of desired product after extraction of the alkaline made solution with Et$_2$O and distillation, b.p. 180°/0.1 mm Hg.

PHARMACEUTICAL PREPARATIONS

EXAMPLE 21

Preparation of tablets

Each tablet contains:

| | |
|---|---|
| 4-aminospiro[2-cyclohexene-1,5′(5′H)-dibenzo[a,d]-cycloheptene]-HCl | 10 mg |
| Lactose | 60 " |
| Starch | 29 " |
| Magnesium stearate | 1 " |

The powders are mixed and directly compressed to tablets with a diameter of 6 mm.

The active substance shown above may be replaced by other pharmaceutically acceptable acid addition salts according to the invention.

EXAMPLE 22

Preparation of tablets

| | |
|---|---|
| 4-aminospiro[2-cyclohexene-1,5′(5′H)-dibenzo[a,d]-cycloheptene] | 50 mg |
| Aerosil (silicium dioxide) | 20 " |
| Lactose | 100 " |
| Starch | 30 " |
| Magnesium stearate | 2 " |

The active principle is mixed with the Aerosil. This mixture is added to the other powders. Tablets are compressed with a diameter of 10 mm.

The active substance shown above may be replaced by other pharmaceutically acceptable acid addition salts according to the invention.

EXAMPLE 23

Preparation of capsules

| | |
|---|---|
| 4-aminospiro[2-cyclohexene-1,5′(5′H)-dibenzo[a,d]- -cycloheptene] | 20 mg |
| Peanut oil | 60 mg |

The solution is filled into soft gelatine capsules. Each capsule containing 20 mg of the active principle.

The active substance shown above may be replaced by other pharmaceutically acceptable acid addition salts according to the invention.

EXAMPLE 24

Preparation of capsules

| | |
|---|---|
| 4-aminospiro[2-cyclohexene-1,5′(5′H)-dibenzo[a,d]- -cycloheptene] | 10 mg |
| Polyoxyethylene sorbitane monoleat | 100 mg |

The capsules are made as described in Example 17.

The active substance shown above may be replaced by other pharmaceutically acceptable acid addition salts according to the invention.

PHARMACOLOGICAL METHODS

A. Biochemical tests

1. Inhibition of the uptake of tritiated 5-HT in vitro and in vivo

The method is described by Ross and Renyi in European Journal of Pharmacology 7 (1969), 270–277. Tricyclic antidepressant drugs of type imipramine given in vivo to mice decrease the uptake of $^3$H-5-HT in vitro. The durgs were administered intraperitoneally half an hour before the animals were killed and the midbrain was taken out and sliced and incubated in a mixture consisting of, per 100 mg of brain slices, 0.2 $\mu$mole of $^3$H-5-HT and 1 $\mu$mole of glucose in 2 ml of Krebs-Henseleit buffer, pH 7.4. The incubation time was 5 minutes with 5 minutes of preincubation before $^3$H-5-HT was added. The radioactive $^3$H-5-HT taken up in the slices was extracted with ethanol and the amount was determined by liquid scintillation. The dose producing 50 per cent decrease of the active uptake (ED$_{50}$) was determined graphically from dose response curves. Active uptake is defined as that part of the radioactive uptake which is inhibited by a high concentration of cocaine. All doses were given at least to four animals.

2. Inhibition of the uptake of tritiated noradrenaline in vitro and in vivo

The method is found in European Journal of Pharmacology 2 (1967), 181–186. The animals were killed half or one hour after the administration of the drugs in vivo (i.p.). The slices, made from cortex, were preincubated for five minutes and incubated with 0.1 $\mu$mole per ml of $^3$H-noradrenaline for further five minutes. The incubation mixture consisted of 0.2 $\mu$mole of $^3$H-NA and the brain slices in 2 ml of Krebs-Henseleits buffer, pH 7.4. The radioactive $^3$H-NA taken up in the slices was extracted with ethanol and the amount was determined by liquid scintillation. The dose producing 50 per cent decrease of the active uptake (ED$_{50}$) was determined graphically from dose response curves. At least four animals were used at each dose level.

B. Pharmacological tests 1. 5-HTP response potentiation test

Inhibition of the uptake of 5-HT potentiates the effects of administered 5-hydroxytryptophan (5-HTP probably by increasing the amount of 5-HT at the receptor. Three mice are given the test drugs one hour (or 4, 24 hours) before dl-5-HTP 90 mg/kg i.v. 5-HTP alone gives only a weak behavioural syndrome but in pretreated mice there is seen a characteristic behavioural syndrome, which comes within five minutes: tremor, lordosis, abduction of the hindlegs, head-twitches.

These small movements are quantitatively measured in an activity box, type Animex, which can distinguish between small and gross movements. The activity is measured during 20 minutes and only in the case the animals have a fullblown syndrome. Each group consists of 3 animals and at least 4 groups were tested at 25 mg/kg i.p. Control groups receiving imipramine (Tofranil) are used as reference, since imipramine constantly potentiated dl-5-HTP.

2. Dopa response potentiation test

Inhibition of monoamine oxidase together with blockage of the uptake of NA potentiate the effects of administrated 1-Dopa. This test is developed by G. M. Everett (Antiderpressant drugs, ed. S. Carattini, 1966).

Mice in groups of 3 are pretreated with Pargyline 40 mg/kg p.o. about 10–16 hours before the test. The test drugs are given i.p. one of 4 hours before 1-Dopa 100 mg/kg i.p. The mice are observed for one hour after 1-Dopa administration. 1-Dopa gives a characteristic syndrome which is scored as follows:

1. piloerection, slight salivation, slight increased motor activity
2. piloerection, salivation, marked increased motor activity and irritability
3. piloerection, profuse salivation, marked irritability and reactivity, jumping, squeaking, fighting.

The control groups are Amitriptyline (20 mg/kg i.p. 4 hours before 1-Dopa) and saline (1 hour before 1Dopa). Amitriptyline always scores three at this dose whereas saline give a one score. The test drugs were all tested at 10 mg/kg i.p.

MOTOR ACTIVITY IN MICE

The exploratory activity of mice was recorded in a locomotion cage in which the movements were counted each time the animals cross-circuits on electrical current in the bottom plate. The activity was recorded for 10 minutes 1 hour after the administration of the drug. The animals were tested individually. Groups of six mice were used and the mice were only used once. The activity was expressed in per cent of the activity of control groups ran simultaneously.

DRUG INDUCED ARRHYTMIAS IN RABBITS

Test drugs were intravenously administered to male rabbits anesthesized with amytal. The doses were increased stepwise up to the lethal dose and the first dose which induced arrhythmia was noted.

ACUTE TOXICITY, BEHAVIOUR AND ANTICHOLINERGIC STUDY IN MICE

The compounds were given by intravenous route to 3 mice. $LD_{50}$ is the dose which kills 50% of the animals within 24 hours. Seizures, gait, sedation and grip strength were recorded. Pupil width (mydriasis) which reveals peripheral anticholinergic action was measured in green light. These data are expressed in per cent of control values 10 minutes after injection. $PD_{200}$ is the dose which increases the pupill by 200 %.

| Substance | Inhibition (50 %) of uptake in vitro | | Inhibition (50 %) of uptake in vivo | | Potentiation of | | Motor activity $ID_{50}$ | Peripheral anticholinergic action $PD_{200}$ mg/kg i.v. | Acute toxicity $LD_{50}$ mg/kg i.v. | Arrythmia (rabbit) Accumulated i.v. dose where there are signs of arrythmia |
|---|---|---|---|---|---|---|---|---|---|---|
| | 5-HT[1] | NA[2] | 5-HT[1] | NA[2] | 5-HTP[3] | 1-DOPA[4] | | | | |
| | $\mu$g/ml | | mg/kg i.p. | | Effective dose, mg/kg i.p. | | | | | |
| CPG 186 | >10 | 1.5 | 28 | 14 | 25 | >10 | >50 | >25 | 25 | >10 |
| CPG 264 | 1.3 | 0.3 | >40 | 1.3 | >25 | >10 | 13 | 2.5 | 23 | — |
| CPG 146 | 4 | 0.02 | >40 | 1.7 | — | — | — | 1 | 30 | — |
| SIR 109 | 1.3 | 1.5 | >40 | 40 | —[5] | —[5] | 5 | — | — | — |
| CPG 147 | 4 | 0.05 | >40 | 1.5 | >25 | 2.5 | 27 | 1 | 32 | — |
| CPG 191 | 2 | 1.5 | >40 | >40 | >25 | >10 | 53 | <10 | 32 | — |
| CPG 148 | 3 | 1.5 | >40 | >40 | >25 | >10 | 35 | 3.5 | 60 | |
| SIR 117 | .5 | 1.5 | >40 | >40 | >25 | >10 | 14 | 15 | 27 | |
| SIR 118 | 4 | 1.5 | >40 | >40 | >25 | >10 | 11 | 9 | 18 | |
| SIR 114 | 7 | 2.5 | >40 | >40 | >25 | >10 | 5.5 | 15 | 22 | |
| Imipramine | 0.1 | 0.06 | 24 | 6 | 25 | 10 | 45 | 13 | 28 | 3 |

[1]5-HT = 5-hydroxytryptamine $10^{-7}$M
[2]NA = dl-noradrenaline $10^{-7}$M
[3]5-HTP = 1-5-hydroxytryptophan
[4]1-DOPA = 1-3,4-dihydroxyphenyl-alanine
[5]impossible to test because tranquilizing effect of the compound.

EVALUATION OF THE RESULTS OBTAINED IN THE PHARMACOLOGICAL TESTS

The results are summarized in the table. The compounds of the invention block both the uptake of noradrenaline and 5-hydroxytryptamine in brain slices in vitro and in vivo. Three compounds CPG 146, 147 and 264 are about three times as effective as imipramine in blocking the uptake of noradrenaline in vivo, whereas CPG 186 blocks the uptake of 5-HT in equivalent doses. The interactions with 5-hydroxytryptophan and 1-dopa correlates well with the uptake inhibition of noradrenaline and 5-hydroxytryptamine. The intravenous toxicity of the compounds is about comparable to that of imipramine. CPG 186 is devoid of the anticholinergic effects shared by imipramine and the other compounds presented in the table and CPG 186 did not cause arrhythmia in nonlethal doses in rabbits which imipramine did and gave sedation only in high doses. Some of the compounds were strongly sedative or tranquilizing such as SIR 109.

These results indicate that in this series of compounds it is possible to differentiate the uptake inhibition from the unwanted side effects and to find potent and selective inhibitions of the amine uptake in the brain.

What we claim is:

1. A compound selected from the group consisting of

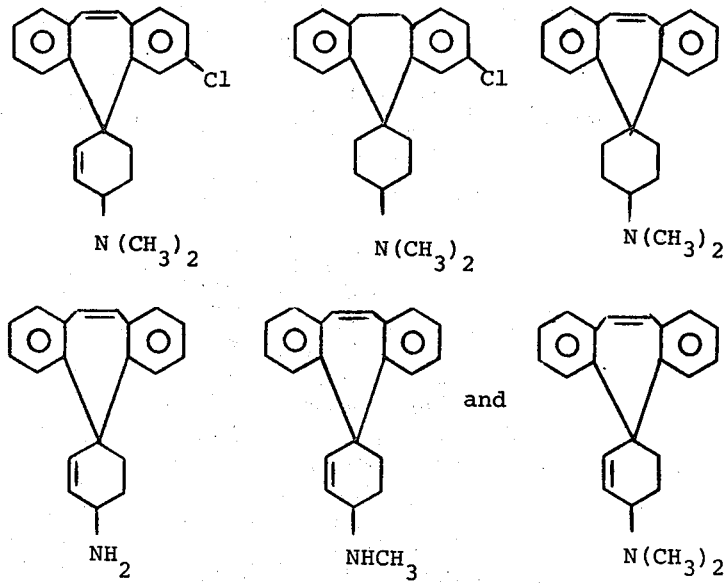

and pharmaceutically acceptable salts thereof.

2. A compound according to claim 1 in the form of an optically pure isomer.

3. The compound having the structural formula

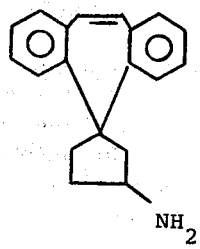

and pharmaceutically acceptable salts thereof.

4. A compound according to claim 1 having the structure

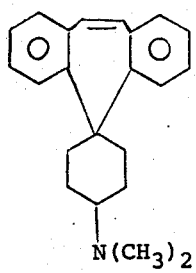

and pharmaceutically acceptable salts thereof.

5. A compound according to claim 1 having the structure

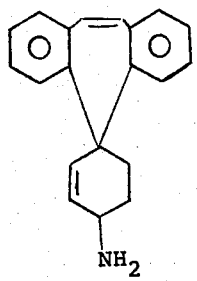

and pharmaceutically acceptable salts thereof.

6. A compound according to claim 1 having the structure

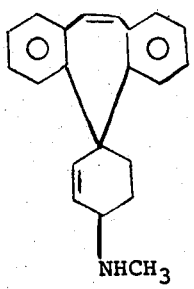

and pharmaceutically acceptable salts thereof.

7. A compound according to claim 1 having the structure

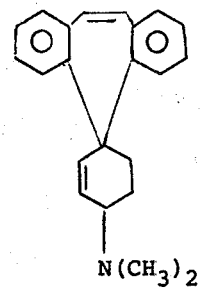

and pharmaceutically acceptable salts thereof.

8. A compound of the formula

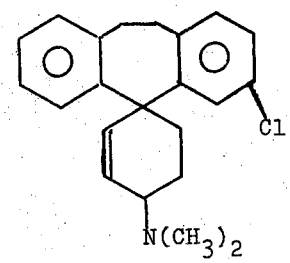

and pharmaceutically acceptable salts thereof.

* * * * *

UNITED STATES PATENT AND TRADEMARK OFFICE
CERTIFICATE OF CORRECTION

PATENT NO. : 3,904,691
DATED : September 9, 1975
INVENTOR(S) : Bernt Sigfrid Emanuel Carnmalm et al.

It is certified that error appears in the above—identified patent and that said Letters Patent are hereby corrected as shown below:

Col. 28, delete the first two structural formulas reading from left to right, which contain the chlorine substituent, of Claim 1

Signed and Sealed this second Day of March 1976

[SEAL]

Attest:

RUTH C. MASON
Attesting Officer

C. MARSHALL DANN
Commissioner of Patents and Trademarks